(12) United States Patent
Hayashi

(10) Patent No.: US 9,010,390 B2
(45) Date of Patent: Apr. 21, 2015

(54) PNEUMATIC TIRE WITH SIPE HAVING BIDIRECTIONAL RIDGE PORTION ROWS AND BIDIRECTIONAL VALLEY PORTION ROWS

(75) Inventor: Naohiro Hayashi, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 969 days.

(21) Appl. No.: 12/989,588

(22) PCT Filed: Apr. 23, 2009

(86) PCT No.: PCT/JP2009/058073
§ 371 (c)(1),
(2), (4) Date: Oct. 25, 2010

(87) PCT Pub. No.: WO2009/131176
PCT Pub. Date: Oct. 29, 2009

(65) Prior Publication Data
US 2011/0048602 A1    Mar. 3, 2011

(30) Foreign Application Priority Data
Apr. 25, 2008   (JP) .................. 2008-116127

(51) Int. Cl.
*B60C 11/12*   (2006.01)
*B60C 11/11*   (2006.01)

(52) U.S. Cl.
CPC ............... *B60C 11/12* (2013.01); *B60C 11/11* (2013.01); *B60C 11/1218* (2013.01); *B60C 2011/1213* (2013.01)

(58) Field of Classification Search
CPC ................. B60C 11/1218; B60C 2011/1213
USPC .................. 152/209.21, 209.23, DIG. 3
See application file for complete search history.

(56) References Cited

U.S. PATENT DOCUMENTS 5,350,001 A * 9/1994 Beckmann et al. ...... 152/DIG. 3
6,116,310 A * 9/2000 Shinohara ............. 152/DIG. 3

(Continued)

FOREIGN PATENT DOCUMENTS

EP    0 564 435 A1   10/1993
EP    0 864 448 A2    9/1998

(Continued)

OTHER PUBLICATIONS

Machine translation for Japan 2007-045316 (no date).*

(Continued)

*Primary Examiner* — Steven D Maki
(74) *Attorney, Agent, or Firm* — Sughrue Mion, PLLC

(57) ABSTRACT

It is a problem to provide a pneumatic tire where disengagement between sipe wall surfaces is suppressed.
In a sipe formed in a block of a tread portion, two ridge portions (32) and (34) are formed in one sipe wall surface (29P), and two valley portions that engage with the ridge portions (32) and (34) are formed in another sipe wall surface. The two ridge portions (32) and (34) form a merged portion (30) where they merge together in the center of a sipe lengthwise direction and at their tire radial direction outside ends, and the two ridge portions (32) and (34) extend linearly from the merged portion (30) toward both sipe-lengthwise-direction end sides (F) and (K) so as to gradually move apart inward in the tire radial direction. Because of this configuration, the contact length of the adjacent sipe wall surfaces in a sipe depth direction (R) becomes longer.

8 Claims, 12 Drawing Sheets

(56) References Cited

U.S. PATENT DOCUMENTS

| | | | |
|---|---|---|---|
| 2006/0016533 A1* | 1/2006 | Ohashi | 152/151 |
| 2006/0027295 A1* | 2/2006 | Knispel et al. | 152/DIG. 3 |
| 2008/0115870 A1* | 5/2008 | Ohashi et al. | 152/209.15 |
| 2009/0283189 A1* | 11/2009 | Mun | 152/209.18 |

FOREIGN PATENT DOCUMENTS

| | | | | |
|---|---|---|---|---|
| JP | 04-372406 A | * | 12/1992 | |
| JP | 06-143942 A | * | 5/1994 | |
| JP | 08-099506 A | | 4/1996 | |
| JP | 09-094829 A | | 4/1997 | |
| JP | 10-258615 A | | 9/1998 | |
| JP | 11-048721 A | | 2/1999 | |
| JP | 2003-118322 A | * | 4/2003 | |
| JP | 2003-118322 A | | 4/2003 | |
| JP | 2003-182314 A | * | 7/2003 | |
| JP | 2003-182314 A | | 7/2003 | |
| JP | 2007-045316 A | * | 2/2007 | |

OTHER PUBLICATIONS

Machine translation for Japan 2003-182314 (no date).*
Machine translation for Japan 2003-118322 (no date).*
Machine translation for Japan 06-143942 (no date).*
International Search Report for PCT/JP2009/058073, Jun. 2, 2009.
Extended European Search Report issued in the corresponding European Application No. 09735361.9 dated Dec. 1, 2011.

* cited by examiner

PNEUMATIC TIRE WITH SIPE HAVING BIDIRECTIONAL RIDGE PORTION ROWS AND BIDIRECTIONAL VALLEY PORTION ROWS

CROSS REFERENCE TO RELATED APPLICATIONS

This application is a National Stage of International Application No. PCT/JP2009/058073 filed Apr. 23, 2009, claiming priority based on Japanese Patent Application No. 2008-116127 filed Apr. 25, 2008, the contents of all of which are incorporated herein by reference in their entirety.

TECHNICAL FIELD

The present invention relates to a pneumatic tire where plural blocks that have sipes are formed in a tread portion.

BACKGROUND ART

In order to improve brake performance (braking performance) on ice, increasing the number of sipes in the tread portion and narrowing the intervals between the sipes has conventionally been carried out. Additionally, giving the sipe depth direction a zigzag shape to further improve on-ice brake performance has also been carried out (e.g., see patent documents 1 to 4).
 Patent Document 1: JP-A No. 2003-118332
 Patent Document 2: JP-A No. 10-258615
 Patent Document 3: JP-A No. 8-99506
 Patent Document 4: EP 0864448 B1

DISCLOSURE OF THE INVENTION

Problem that the Invention is to Solve

Incidentally, when sipes that have been given a zigzag shape in the sipe depth direction in this manner are formed, on icy and snowy road surfaces, the zigzag-shaped sipe wall surfaces contact each other at the time of ground contact and suppress collapsing of the blocks, whereby high brake performance is exhibited.

However, when a large driving force or braking force acts particularly on a dry road surface, the blocks greatly deform such that the engagement between the zigzag-shaped sipe wall surfaces ends up going out of alignment and the block rigidity drops. As a result, the tire contacts the road surface at the sipe edge portions or by so-called point-contact, it becomes difficult to suppress collapsing of the blocks, and it becomes easier for a tearing force to arise in the sipe bottoms.

In consideration of the circumstances described above, the present invention aims to provide a pneumatic tire where disengagement between the sipe wall surfaces is suppressed.

Means for Solving the Problem

In a first aspect of the present invention of a pneumatic tire, plural blocks demarcated by circumferential direction grooves and transverse grooves are formed in a tread portion, in the blocks, there is formed at least one sipe in which bidirectional ridge portion rows are formed in one sipe wall surface and bidirectional valley portion rows that engage with the bidirectional ridge portion rows are formed in another sipe wall surface, and the bidirectional ridge portion rows form a merged portion where they merge together inward in a sipe lengthwise direction, and the bidirectional ridge portion rows extend linearly toward both sipe-lengthwise-direction end sides so as to gradually move apart inward in a tire radial direction.

The one sipe wall surface and the other sipe wall surface other have zigzag shapes, but they may also have wave shapes or trapezoidal shapes (shapes where a cross-sectionally convex trapezoidal shape and a cross-sectionally concave trapezoidal shape overlap). A zigzag-shaped sipe is a sipe where sipe portions that slant with respect to the direction in which the sipe extends double back and extend such that the direction of inclination alternates.

In the first aspect of the present invention, the bidirectional ridge portion rows of the one sipe wall surface and the bidirectional valley portion rows of the other sipe wall surface are configured to have this shape, so even when a force that shifts the sipe wall surfaces in the tire radial direction is inputted to the block, the contact length between the adjacent sipe wall surfaces in the sipe depth direction (block height direction) becomes longer as compared to conventionally. Thus, even when a large input is applied to the block, a certain extent of contact length can be ensured. Consequently, disengagement between the sipe wall surfaces is suppressed, and movement of small blocks that are formed in the block by the sipe is also suppressed. Thus, a situation where the block collapses such that a tearing force arises in the sipe bottom is avoided.

In a second aspect of the present invention of the pneumatic tire, in the one sipe wall surface, there is formed a ground-contacting surface side ridge portion that extends from the bidirectional ridge portion rows toward a block ground-contacting surface side and that is orthogonal to a block ground-contacting surface, and in the other sipe wall surface, there is formed a ground-contacting surface side valley portion that engages with the ground-contacting surface side ridge portion.

Thus, the block can be prevented from rising from the ground-contacting surface. Further, it is easy to implant a blade for sipe formation when creating a mold.

In a third aspect of the present invention of the pneumatic tire, angles of inclination of the bidirectional ridge portion rows with respect to the tire radial direction are both in the range of 20° to 70°.

When the angles of inclination are smaller than 20°, it is easy for the contact force between the sipe wall surfaces to become weak. Further, when the angles of inclination are larger than 70°, the contact force between the sipe wall surfaces becomes too strong, and it becomes easy for the engagement between the sipe wall surfaces to go out of alignment.

When the angles of inclination of the bidirectional ridge portions rows with respect to the tire radial direction are both in the range of 30° to 60°, a situation where the contact force between the sipe wall surfaces becomes too weak or becomes too strong can be avoided even more reliably.

In a fourth aspect of the present invention of the pneumatic tire, each of the bidirectional ridge portion rows is bent in a straight-line arrangement linearly at a midway point.

In the fourth aspect of the present invention, each ridge portion becomes formed in plural stages (e.g., two stages) because of this bend, and the number of places where the sipe wall surfaces contact each other can be increased even more.

In a fifth aspect of the present invention of the pneumatic tire, each of the bidirectional ridge portion rows is bent such that their angles of inclination with respect to the tire radial direction increase inward in the tire radial direction.

Thus, it is more difficult for the sipe wall surfaces to go out of alignment.

In a sixth aspect of the present invention of the pneumatic tire, the shapes of the one sipe wall surface and the other sipe wall surface are symmetrical in a block width direction.

Thus, the difficulty with which the sipe wall surfaces go out of alignment can be made equal on the one side and on the other side in the block width direction.

In a seventh aspect of the present invention of the pneumatic tire, an air gap portion that alleviates stress that occurs because of tearing force is formed in a sipe bottom of the sipe.

Thus, the pneumatic tire can be given a structure where cracks are further prevented from forming from the sipe bottom. The shape of the air gap portion is not particularly limited.

Advantageous Effects of the Invention

According to the present invention, there can be provided a pneumatic tire where disengagement between the sipe wall surfaces is suppressed.

BEST MODES FOR CARRYING OUT THE INVENTION

Modes of carrying out the present invention will be described below by way of embodiments. Beginning with the second embodiment, the same reference signs will be given to components that are the same as components that have already been described, and description thereof will be omitted.

First Embodiment

Figure 1:
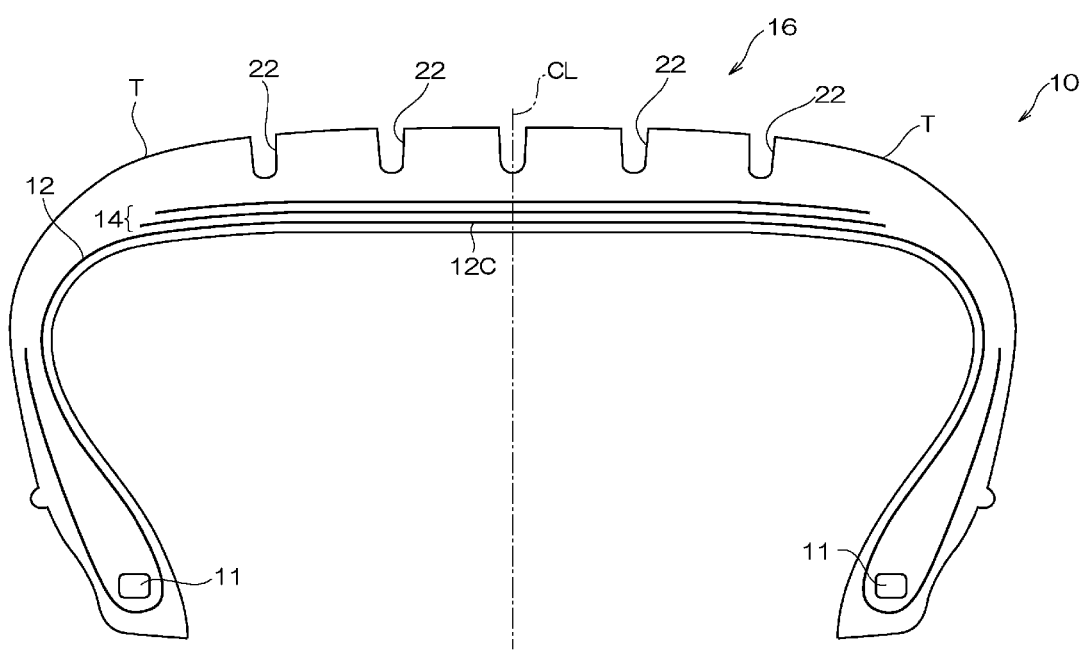
FIG. 1 is a tire radial direction cross-sectional view of a pneumatic tire pertaining to a first embodiment.

First, a first embodiment will be described. As shown in FIG. 1, a pneumatic tire 10 pertaining to the present embodiment is equipped with a carcass 12 that is configured by one layer or plural layers, both end portions of which are folded at a bead core 11.

A belt layer 14 comprising plural (e.g., two) belt plies that are superimposed is buried in the carcass 12 on the tire radial direction outside of a crown portion 12C.

Figure 2:
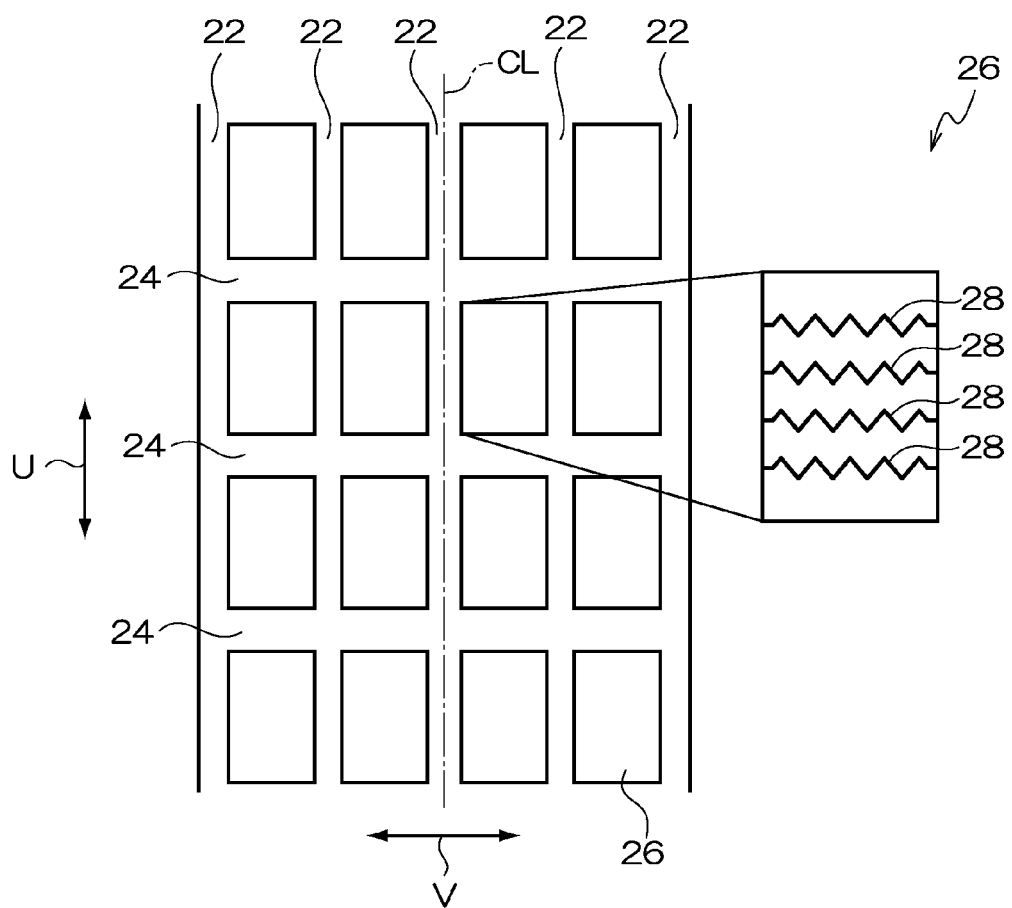
FIG. 2 is an explanatory diagram showing, in a planar state, a block arrangement of a tread portion of the pneumatic tire pertaining to the first embodiment.

A tread portion 16 disposed with grooves is formed on the tire radial direction outside of the belt layer 14. As shown in FIG. 2, plural circumferential direction grooves (main grooves) 22 along a tire circumferential direction U are formed on a tire equatorial plane CL and on both sides thereof in the tread portion 16. Further, plural transverse grooves 24 that intersect the tire circumferential direction U are formed in the tread portion 16. In the present embodiment, the transverse grooves 24 are formed along a tire width direction V. Both end portions of each of the transverse grooves 24 are communicated with the circumferential direction grooves 22 or go beyond tread ends T so as to be capable of draining water to the tire width direction outsides.

Here, "tread ends" are tire width direction outermost ground-contacting portions when a pneumatic tire is mounted on a standard rim stipulated in *JATMA Year Book* (2007 edition; Japan Automobile Tyre Manufacturers Association standards), the pneumatic tire is filled with air such that its internal pressure reaches 100% of the air pressure (maximum air pressure) corresponding to the maximum load capability (the boldface load in the internal pressure-load capability correspondence table) in the applied size ply rating in *JATMA Year Book*, and the tire is carrying its maximum load capability. When TRA standards or ETRTO standards are applied in use sites or production sites, then the tire adheres to those standards.

As shown in FIG. 2, numerous blocks 26 are formed by the circumferential direction grooves 22 and the transverse grooves 24 in the tread portion 16.

Figure 3:
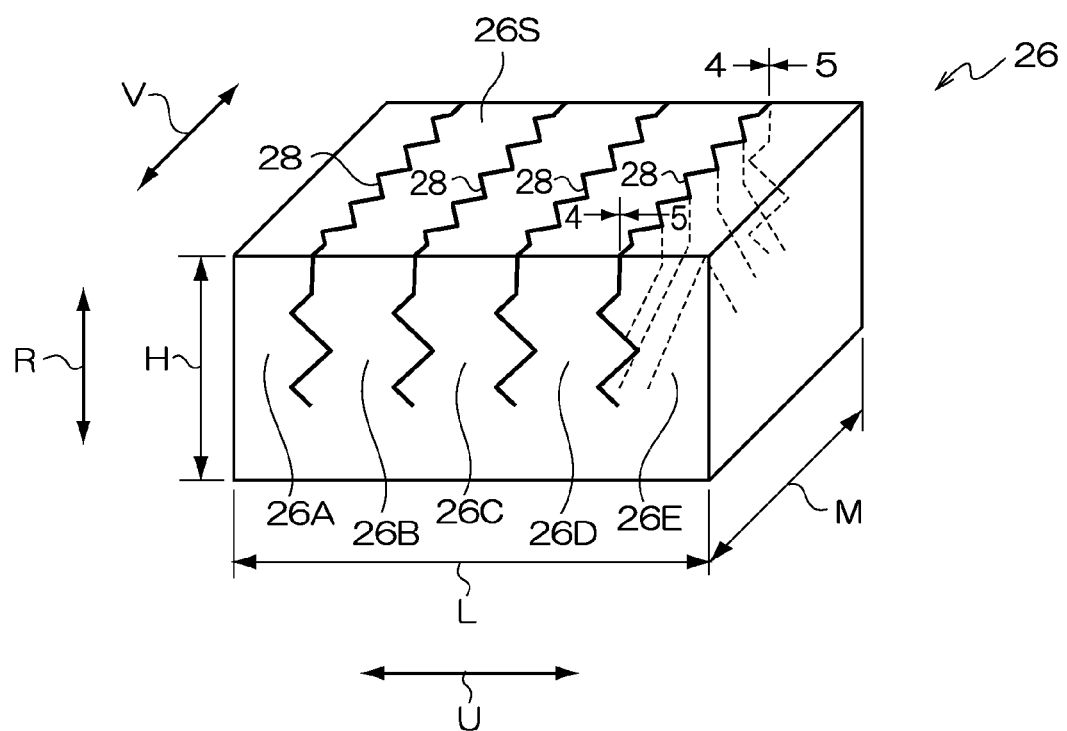
FIG. 3 is a perspective view of a block configuring the tread portion of the pneumatic tire pertaining to the first embodiment (a state where the block is positioned on the upper side of the tire)

As shown in FIG. 2 and FIG. 3, sipes 28 configured to have a zigzag shape in three dimensions are formed along the transverse grooves 24 in each of the blocks 26. Both ends of each of the sipes 28 open to both side walls of the block and are communicated with the circumferential direction grooves 22, such that the sipes 28 are configured as so-called open sipes. In the present embodiment, there are four of the sipes 28 formed in each of the blocks 26, and five small blocks 26A to 26E are formed in each of the blocks 26 by the sipes 28. Further, in the present embodiment, the sipes 28 are all formed along the width direction of the blocks 26, that is, along the tire width direction V.

These four sipes formed in each of the blocks have an identical shape, so the shape of one of the sipes will be described in detail below.

Figure 4A:
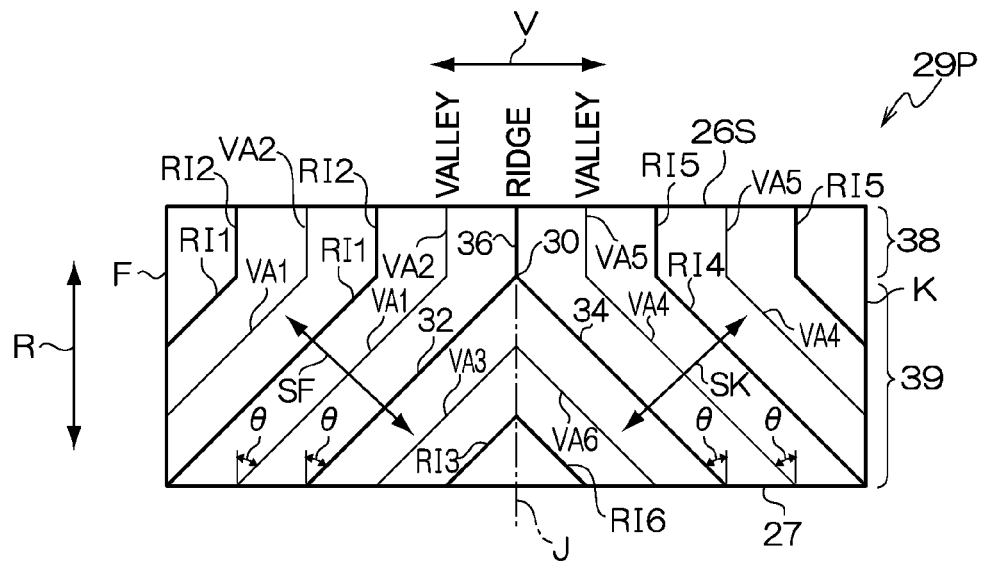
FIG. 4A is a front view of a sipe wall surface as seen from arrows 4-4 of FIG. 3.
Figure 4B:
FIG. 4B is a plan view of a sipe formed in a block ground-contacting surface of the pneumatic tire pertaining to the first embodiment.

As shown in FIG. 4A and FIG. 4B, in one sipe wall surface 29P formed by the sipe 28, that is, in a sipe wall surface 29P as seen from arrows 4-4 of FIG. 3, there are formed two ridge portions 32 and 34, which form a merged portion 30 where they merge together in the center of the sipe lengthwise direction and at their tire radial direction outside ends, and a ground-contacting surface side ridge portion 36, which extends from the merged portion 30 toward a block ground-contacting surface side and is orthogonal to a block ground-contacting surface 26S. This merged portion 30 is positioned on a lengthwise direction centerline J of the sipe wall surface 29P, and the shape of the sipe wall surface 29P is symmetrical with respect to the lengthwise direction centerline J, that is, symmetrical in the block width direction.

The two ridge portions 32 and 34 extend linearly from the merged portion 30 toward both sipe-lengthwise-direction end sides (that is, toward one sipe-lengthwise-direction end side F and another sipe-lengthwise-direction end side K) so as to gradually move apart inward in the tire radial direction. Consequently, the two ridge portions 32 and 34 form a V-shape.

In the present embodiment, angles of inclination θ of the two ridge portions 32 and 34 with respect to a tire radial direction R are configured to be the same. Further, these angles of inclination θ are configured to be in the range of 20° to 70°.

Further, from the ridge portion 32 toward the one sipe-lengthwise-direction end side F, valley portions VA1 and ridge portions RI1 are arranged alternately and parallel to each other. Additionally, from the ground-contacting surface side ridge portion 36 toward the one sipe-lengthwise-direction end side F, ground-contacting surface side valley portions VA2 and ground-contacting surface side ridge portions RI2 are arranged alternately and parallel to each other. Moreover, from the ridge portion 32 toward the lengthwise direction centerline J, that is, from the ridge portion 32 inward in the tire radial direction, a valley portion VA3 and a ridge portion RI3 are sequentially formed parallel to each other.

From the ridge portion 34 toward the other sipe-lengthwise-direction end side K also, valley portions VA4 and ridge portions RI4 are arranged alternately and parallel to each other. Additionally, from the ground-contacting surface side ridge portion 36 toward the other sipe-lengthwise-direction end side K, ground-contacting surface side valley portions VA5 and ground-contacting surface side ridge portions RI5 are arranged alternately and parallel to each other. Moreover, from the ridge portion 34 toward the lengthwise direction centerline J, that is, from the ridge portion 34 inward in the tire radial direction, a valley portion VA6 and a ridge portion RI6 are sequentially formed parallel to each other. As can be seen from FIGS. 4A and 4B, in sipe wall surface 29P, inclined ridge portion 32, the adjacent inclined valley portion VA1 and the adjacent inclined ridge portion RI1 form a V shape in a direction perpendicular to the length direction of the sipe.

Figure 5:
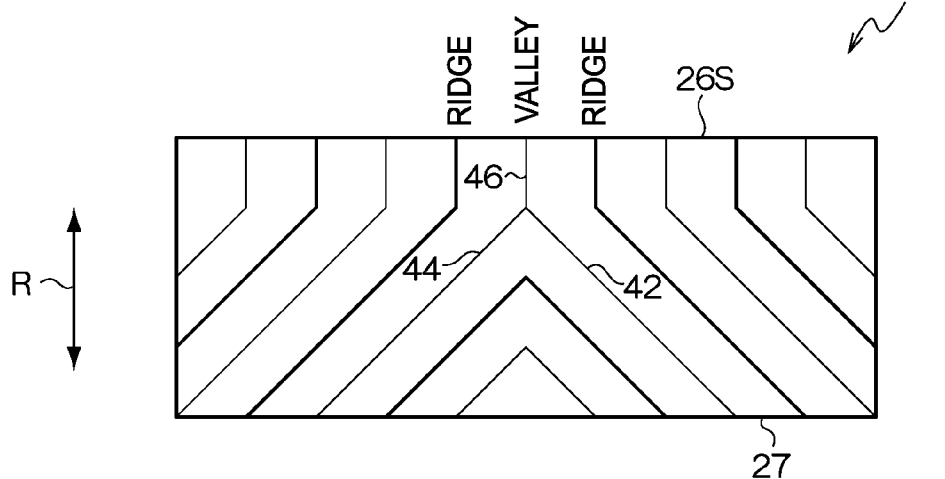
FIG. 5 is a front view of a sipe wall surface as seen from arrows 5-5 of FIG. 3.

As shown in FIG. 5, in a sipe wall surface 29Q that opposes the sipe wall surface 29P, that is, in a sipe wall surface 29Q as seen from arrows 5-5 of FIG. 3, ridge portions and valley portions are formed so as to engage with those of the sipe wall surface 29P. For example, valley portions 42 and 44 that engage with the ridge portions 32 and 34 are formed in positions in the sipe wall surface 29Q that oppose the ridge portions 32 and 34, and a ground-contacting surface side valley portion 46 that engages with the ground-contacting surface side ridge portion 36 is formed in a position that opposes the ground-contacting surface side ridge portion 36.

Because of this configuration, in the sipe portion where the sipe depth is shallow from the merged portion 30, there is formed a sipe portion that extends in a zigzag shape along the tire width direction (block width direction) V, that is, a sipe portion (hereinafter called a parallel-to-depth-direction sipe portion 38) where the ground-contacting surface side ridge portions 36, RI2, and RI5 and the ground-contacting surface side valley portions VA2 and VA5 are parallel to the tire radial direction (sipe depth direction) R. Additionally, in the sipe portion where the sipe depth is deep from the merged portion 30, there is formed a sipe portion (hereinafter called a V-shaped sipe portion 39) that extends in a zigzag shape in direction SF and direction SK (see FIG. 4A for both) that are diagonal directions with respect to the tire radial direction (sipe depth direction) R.

Action and Effects

The action and effects when the pneumatic tire 10 pertaining to the present embodiment is mounted on a vehicle and travels on an icy road surface and a dry road surface will be described below.

When the pneumatic tire 10 travels on an icy road surface, a high input is not applied that much to the blocks 26 in comparison to when the pneumatic tire 10 travels on a dry road surface. However, when the pneumatic tire 10 travels on a dry road surface, the blocks 26 receive a high input (driving force and braking force) from the road surface, so this collapse suppression exhibits a large effect. Suppression of collapse of the blocks 26 when the pneumatic tire 10 travels on a dry road surface and high input is applied from the road surface will be described in detail using FIG. 6 and FIG. 7. In order to made it easier to understand the description, in FIG. 6 and FIG. 7, the sipe wall surface region of the V-shaped sipe portion 39 from the ridge portions to the tire radial direction inside valley portions is indicated by dots.

Figure 7:
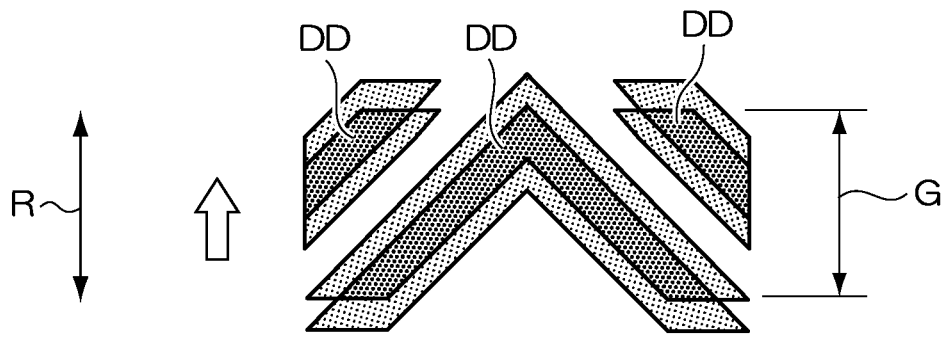
FIG. 7 is an explanatory diagram describing the contact length between the adjacent sipe wall surfaces in the sipe depth direction in the first embodiment.

In travel on a dry road surface or the like, a large driving force or braking force acts on the blocks 26. Because of this driving force or braking force, a force by which the adjacent sipe wall surfaces go out of alignment in the tire radial direction acts. As a result, as shown in FIG. 7, in the adjacent sipe wall surfaces, the regions indicated by dots go out of alignment in the tire radial direction.

Figure 6:
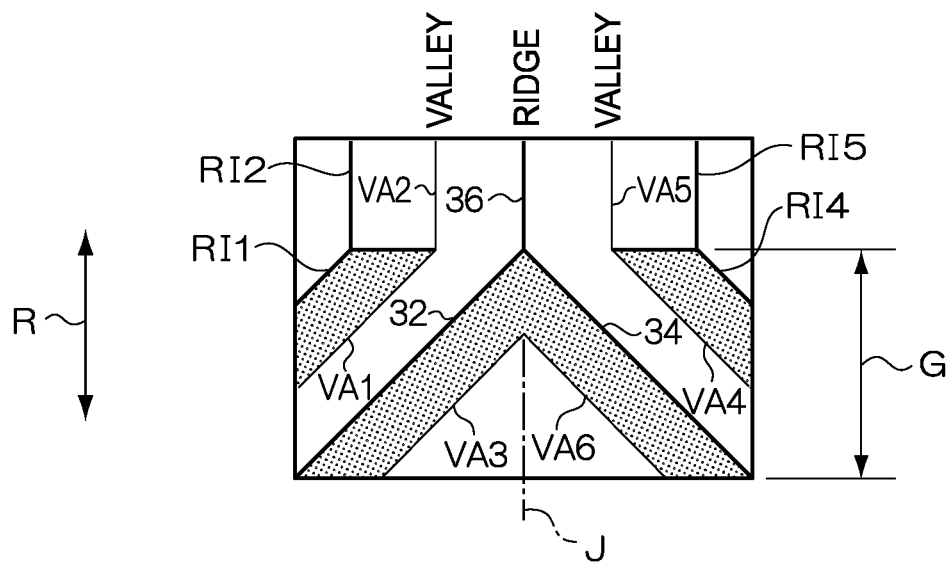
FIG. 6 is an explanatory diagram describing the contact length between the adjacent sipe wall surfaces in a sipe depth direction in the first embodiment.

Here, as shown in FIG. 6, in the V-shaped sipe portion 39, the ridge portions 32, 34, RI1, and RI4 and the valley portions VA1, VA3, VA4, and VA6 slant with respect to the sipe depth direction (block height direction) R, so a contact length G in the sipe depth direction R of the regions indicated by dots becomes longer as compared to conventionally. Consequently, as shown in FIG. 7, even when a large input is applied to the blocks 26 such that the adjacent sipe wall surfaces go out of alignment by ¼ wavelength in the tire radial direction, this contact length G (the length in the sipe depth direction R of regions DD indicated by overlapping dots in FIG. 7) can be ensured to a certain extent. Consequently, disengagement between the sipe wall surfaces is suppressed, and movement of the small blocks 26A to 26E that are formed in the blocks 26 by the sipes 28 is also suppressed. Thus, a situation where the blocks 26 collapse such that a tearing force arises in sipe bottoms 27 is avoided.

As described above, in the present embodiment, the sipes 28 that have the V-shaped sipe portions 39 are formed in the blocks 26, so even when the input to the blocks 26 is large, it is difficult for the sipe wall surfaces to become disengaged. Thus, it is difficult for the blocks 26 to collapse, and it is difficult for a tearing force to occur in the sipe bottoms 27. Additionally, the V-shaped sipe portions 39 have zigzag-shaped components in the depth direction also, so brake performance on ice improves.

Further, the parallel-to-depth-direction sipe portions 38 are formed in the sipe wall surfaces 29P and 29Q. Thus, the blocks 26 can be prevented from rising from the ground-contacting surface. Further, it is easy to implant a blade for sipe formation in a mold when forming the sipes 28.

Moreover, both ends of each of the sipes 28 open to the circumferential direction grooves 22, such that the sipes 28 are configured as open sipes. Consequently, air inside the sipes 28 becomes flushed out from both ends of the sipes 28 toward the circumferential direction grooves 22 in accompaniment with water absorption. Consequently, the water absorption amount and the water absorption speed can be raised as compared to closed sipes where both ends of the sipes do not open to the circumferential direction grooves 22.

Further, the V-shaped sipe portions 39 face outward with respect to the depth direction, so the speed with which water is drained from both ends of each of the sipes can be raised.

Further, the shapes of the sipe wall surfaces 29P and 29Q are symmetrical with respect to the lengthwise direction centerline J, that is, symmetrical in the block width direction. Thus, the difficulty with which the sipe wall surfaces go out of alignment can be made equal on the one side and on the other side in the block width direction.

Figure 8:
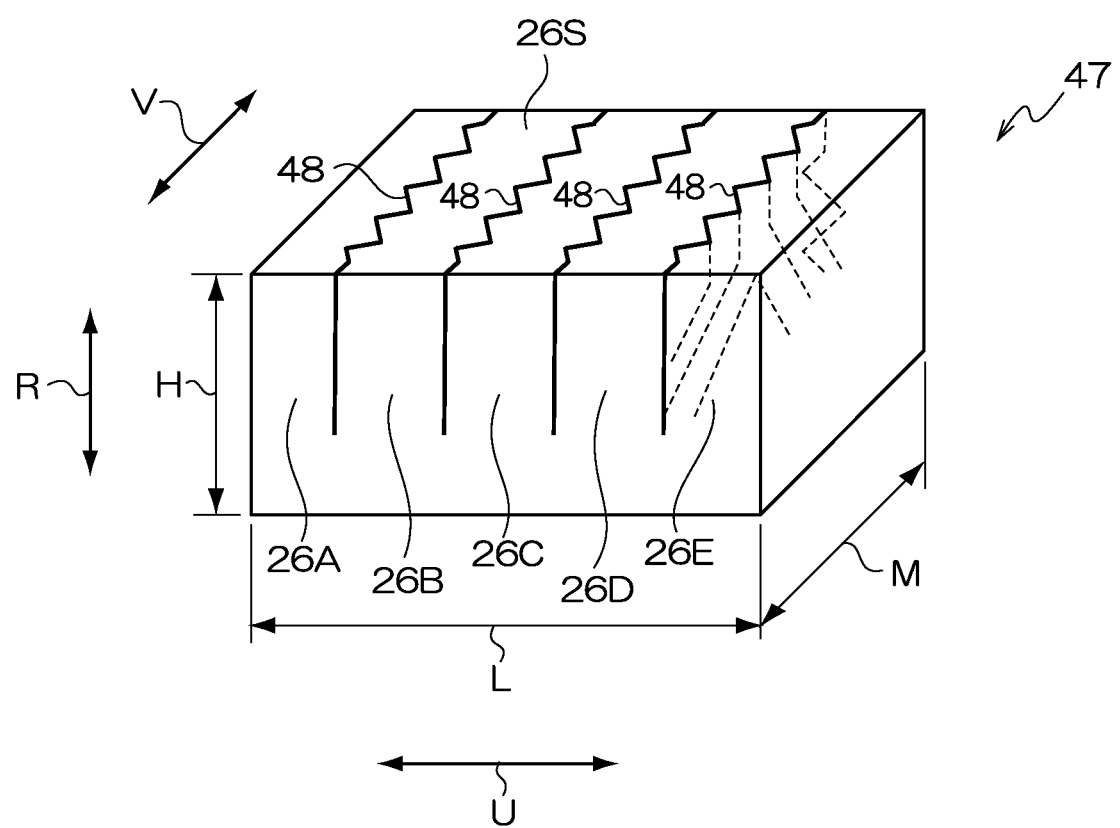
FIG. 8 is a perspective view showing a modification of a block configuring the tread portion of the pneumatic tire pertaining to the first embodiment (a state where the block is on the upper side of the tire)

Instead of the blocks 26, as shown in FIG. 8, blocks 47 in which sipes 48 that are linear at both block side walls may also be formed in the tread portion. Thus, it is easy to implant the blade for sipe formation in the mold.

Second Embodiment

Figure 9A:
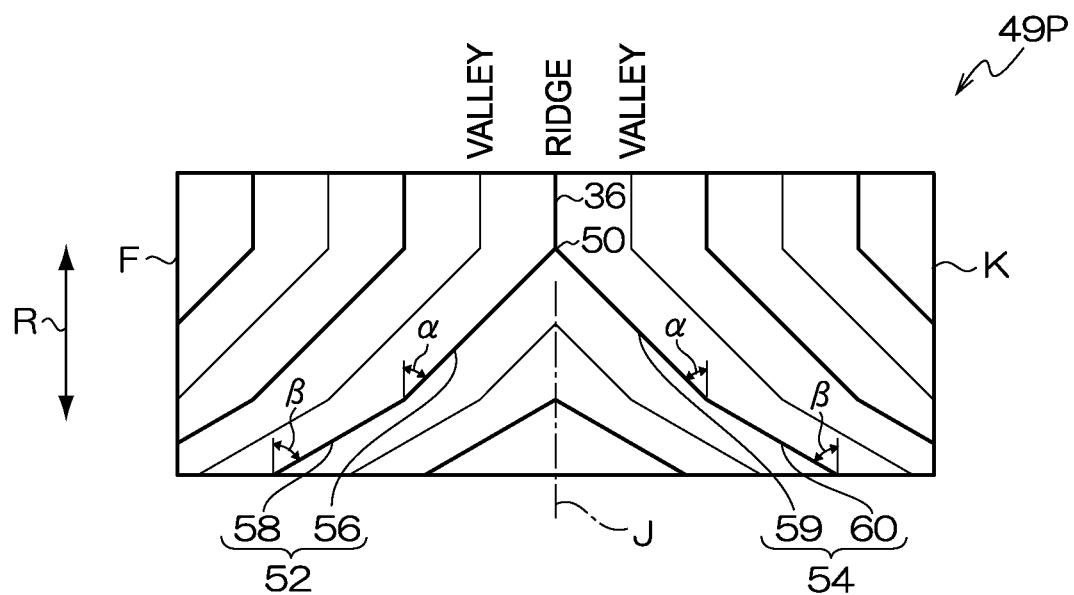
FIG. 9A is a front view of a sipe wall surface of a pneumatic tire pertaining to a second embodiment.
Figure 9B:
FIG. 9B is a plan view of a sipe formed in a block ground-contacting surface of the pneumatic tire pertaining to the second embodiment.

Next, a second embodiment will be described. As shown in FIG. 9A and FIG. 9B, in the present embodiment, as compared to the first embodiment, instead of the two ridge portions 32 and 34, ridge portions 52 and 54 that bend midway are formed in one sipe wall surface 49P. The ridge portions 52 and 54 merge together at their tire radial direction outside ends to form a merged portion 50.

The ridge portion 52 is configured by a first ridge portion 56, which slants with respect to the tire radial direction inside (sipe depth direction) R from the merged portion 50 and extends linearly toward the one end side F in the sipe lengthwise direction, and a linear second ridge portion 58, which is continuous with the tire radiation direction inside end of the first ridge portion 56, slants with respect to the tire radial direction inside, and extends linearly toward the one end side F in the sipe lengthwise direction. Additionally, the first ridge portion 56 and the second ridge portion 58 bend and are continuous.

Angles of inclination of the first ridge portion 56 and the second ridge portion 58 with respect to the tire radial direction are in the range of 20° to 70°. Additionally, an angle of inclination β of the second ridge portion 58 with respect to the tire radial direction (sipe depth direction) is configured to be larger than an angle of inclination α of the first ridge portion 56 with respect to the tire radial direction.

The ridge portion 54 is configured by a first ridge portion 59 and a second ridge portion 50 in which a bend portion is similarly formed such that they become symmetrical with respect to the lengthwise direction centerline J of the sipe wall surface 49P.

In the present embodiment, bend portions are formed in the ridge portions 52 and 54 in this manner, so the number of places where the sipe wall surfaces contact each other can be increased even more.

Further, the angle of inclination β of the second ridge portions 58 and 60 with respect to the tire radial direction (sipe depth direction) is configured to be larger than the angle of inclination α of the first ridge portions 56 and 59 with respect to the tire radial direction. Thus, it is more difficult for the sipe wall surfaces to go out of alignment.

Third Embodiment

Figure 10:
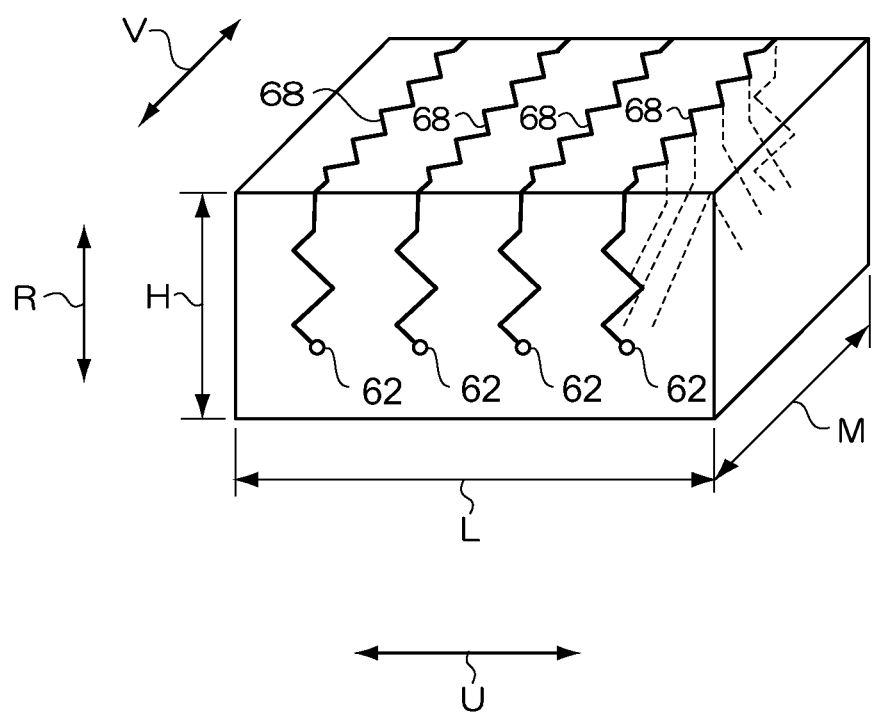
FIG. 10 is a perspective view of a block configuring a tread portion of a pneumatic tire pertaining to a third embodiment (a state where the block is on the upper side of the tire)

Next, a third embodiment will be described. As shown in FIG. 10, in the present embodiment, as compared to the first embodiment, sipes 68 in which air gap portions 62 for tearing force alleviation are further formed in the sipe bottoms are formed instead of the sipes 28.

Thus, the pneumatic tire 10 can be given a structure where cracks are further prevented from forming from the sipe bottoms.

In FIG. 10, the air gap portions 62 are depicted as having cross-sectionally circular cylinder shapes, but the shapes of the air gap portions 62 may also be other shapes by which tearing force is alleviated in the sipe bottoms, such as cross-sectionally elliptical shapes.

TEST EXAMPLE 1

In order to verify the effects of the present invention, the present inventor prepared an example of the pneumatic tire pertaining to the first embodiment (hereinafter called "the tire of the embodiment") and an example of a conventional pneumatic tire (see FIG. 11 and FIGS. 12A to 12C; hereinafter called "the conventional tire") and performed a braking performance test on an icy road surface to evaluate braking performance (brake performance).

Here, the conventional tire was a tire where four sipes 88 configured to have zigzag shapes in three dimensions—that is, zigzag shapes in both the depth direction and the block width direction—were formed in each block 86. Five small blocks 86A to 86E were formed by these four sipes 88 in each block 86. The shapes of the four sipes 88 were all identical.

Regarding the block dimensions, in the tire of the embodiment, as shown in FIG. 3, the tire circumferential direction length L was 25 mm, the tire width direction length M was 20 mm, and the tire radial direction depth (block height) H was 10 mm. In the conventional tire also, the block dimensions (the values of L, M, and H) were made the same as those of the tire of the embodiment.

Further, regarding the width of the transverse grooves, it was 4 mm in both the tire of the embodiment and the conventional tire.

Figure 11:
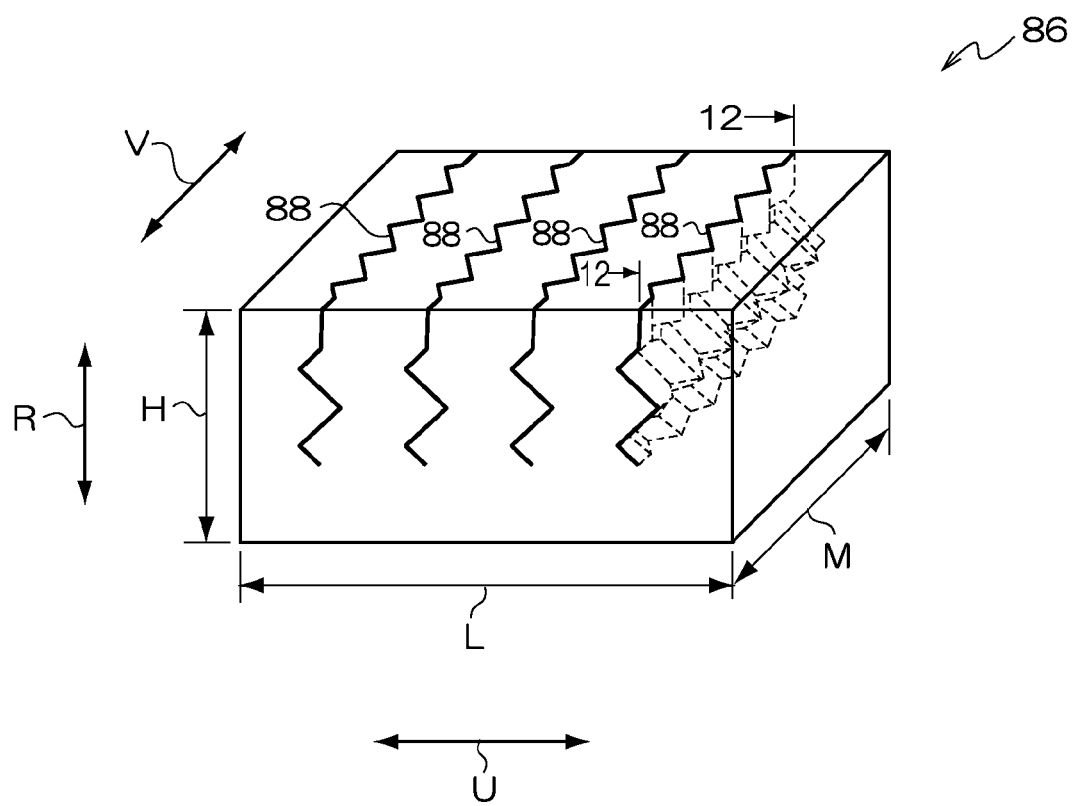
FIG. 11 is a perspective view of a block configuring a tread portion of a conventional pneumatic tire used in test examples 1 and 2 (a state where the block is on the upper side of the tire)

As shown in FIG. 3 and FIG. 11, regarding the sipe depth h, it was 8 mm in both the tire of the embodiment and the conventional tire. Further, the thickness of the five small blocks was 5 mm in both the tire of the embodiment and the conventional tire.

In the present test example, the test was performed by actual car travel in a state where the tire sizes were 195/65R15, the tires were mounted to regular rims, the internal pressure of the tires was 200 kPa, the tires mounted to the regular rims were mounted on a passenger car, and the tires carried a regular load. Here, "regular rims" means standard rims in an applied size determined in the 2007 edition of *Year Book* that JATMA publishes, for example, and "regular load"

means a maximum load in an applied size ply rating similarly determined in the 2007 edition of *Year Book* that JATMA publishes.

In the present test example, the braking distance until the passenger car came to rest after full brakes were applied after reaching an initial velocity of 40 km/h was measured, and average deceleration was calculated from the initial velocity and the braking distance. Additionally, 100 was used for an evaluation index based on the average deceleration of the conventional tire, and an evaluation index serving as a relative evaluation in regard to the tire of the embodiment was calculated. The evaluation results are shown in Table 1.

TABLE 1

|  | Conventional Tire | Tire of Embodiment |
|---|---|---|
| (Test Example 1) On-Ice Brake Performance | 100 | 103 |
| (Test Example 2) Cracks in Sipe Bottoms | Yes | No |

In the evaluation results in Table 1, on-ice performance is higher—that is, braking distance is shorter and braking performance is more excellent—the larger the evaluation index is. As will be understood from Table 1, in the tire of the embodiment, the evaluation index was 103 and braking performance on ice equaled or surpassed that of the conventional tire.

TEST EXAMPLE 2

In the present test example, regarding both the tire of the embodiment and the conventional tire, the tires traveled 3000 km on a dry road surface in a passenger car and an endurance test to check whether or not there were cracks in the sipe bottoms after travel was performed. The test results are shown in Table 1. As will be understood from Table 1, in the conventional tire, cracks had formed in the sipe bottoms, but in the tire of the embodiment, cracks had not formed in the sipe bottoms.

Figure 13:
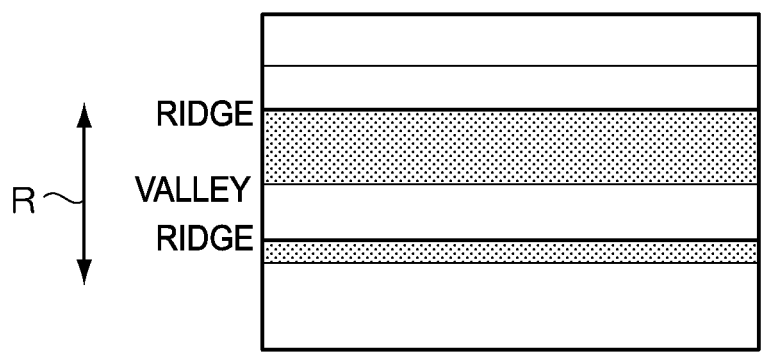
FIG. 13 is an explanatory diagram describing the contact length between the adjacent sipe wall surfaces in the sipe depth direction in the conventional pneumatic tire used in text examples 1 and 2.

The reason cracks formed in the sipe bottoms in the conventional tire is presumed to be as follows. In order to make it easier to understand the description below, in FIG. 13 and FIG. 14, the sipe wall surface region of the sipes 88 formed in the conventional tire from the ridge portions to the tire radial direction inside valley portions is indicated by dots.

Figure 14:
FIG. 14 is an explanatory diagram describing the contact length between the adjacent sipe wall surfaces in the sipe depth direction in the conventional pneumatic tire used in text examples 1 and 2.

In travel on a dry road surface and the like, a large driving force or braking force acts on the blocks 86. Because of this driving force or braking force, a force by which the adjacent sipe wall surfaces go out of alignment in the tire radial direction acts. As a result, as shown in FIG. 14, in the adjacent sipe wall surfaces, the regions indicated by dots go out of alignment in the tire radial direction.

Figure 12A:
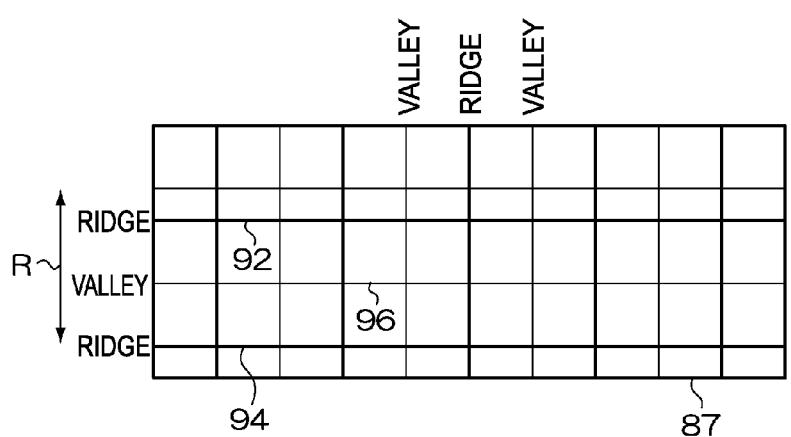
FIG. 12A is a front view of a sipe wall surface of the conventional pneumatic tire used in test examples 1 and 2 (a front view of the sipe wall surface as seen from arrows 12-12 of FIG. 11)
Figure 12C:
FIG. 12C is a side view of the sipe formed in a block side surface of the conventional pneumatic tire used in text examples 1 and 2.
Figure 12B:
FIG. 12B is a plan view of a sipe formed in a block ground-contacting surface of the conventional pneumatic tire used in test examples 1 and 2.

Here, in the sipes 88 of the conventional tire, as shown in FIGS. 12A to 12C, ridge portions 92 and 94 and a valley portion 96 that extend in the tire width direction (block width direction) V are orthogonal with respect to the tire radial direction (sipe depth direction R). Consequently, as shown in FIG. 14, when the regions indicated by dots go out of alignment by ¼ wavelength, for example, in the tire radial direction R, the contact length G between the regions indicated by dots in the sipe depth direction becomes pretty short. For this reason, it is easy for the adjacent sipe wall surfaces to become disengaged.

Figure 15:
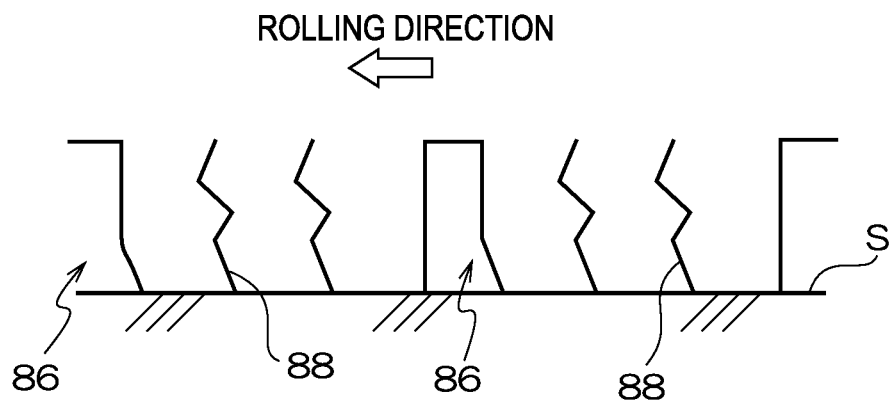
FIG. 15 is a schematic partial side view showing the conventional pneumatic tire used in text examples 1 and 2 rolling on an icy road surface.
Figure 16:
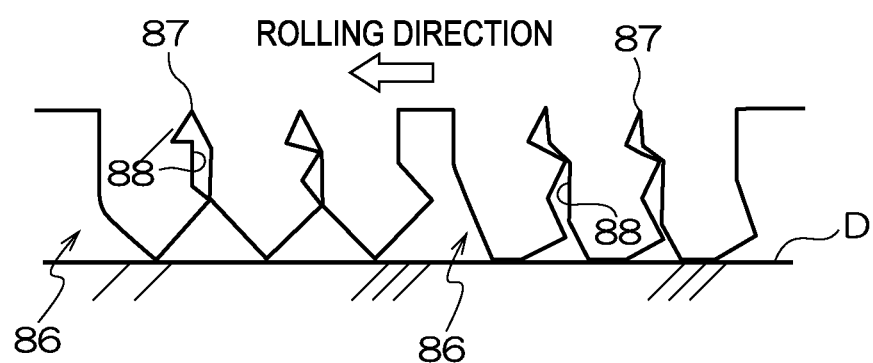
FIG. 16 is a schematic partial side view showing the conventional pneumatic tire used in text examples 1 and 2 rolling on a dry road surface.

Consequently, it is thought that, as shown in FIG. 15, on an icy road surface S, the collapse of the blocks 86 is small and a large tearing force does not arise in the sipe bottoms, but as shown in FIG. 16, on a dry road surface D, the zigzag-shaped sipe wall surfaces become disengaged, the collapse of the blocks 86 becomes large, and it becomes easy for a high tearing force to arise in sipe bottoms 87 (see FIG. 12A).

Modes of carrying out the present invention have been described above by way of embodiments, but these embodiments are only examples and can be variously changed and carried out in a scope that does not depart from the gist. Further, it goes without saying that the scope of rights of the present invention is not limited to these embodiments.

The invention claimed is:

1. A pneumatic tire, wherein
plural blocks demarcated by circumferential direction grooves and transverse grooves are formed in a tread portion,
in the blocks, there is formed at least one sipe in which bidirectional ridge portion rows are formed in one sipe wall surface and bidirectional valley portion rows that engage with the bidirectional ridge portion rows are formed in another sipe wall surface, and
in the one sipe wall surface, there is formed a first pair of inclined ridge portions, the first pair of inclined ridge portions merged at a merged portion, and the first pair of inclined ridge portions respectively extending linearly from the merged portion toward different sipe-lengthwise-direction end sides so that the first inclined ridge portions become farther apart as the first inclined ridge portions extend in the radial direction away from the block ground-contacting surface;
in the one sipe wall surface, there is formed a ground-contacting surface side ridge portion that extends from the merged portion toward a block ground-contacting surface side, wherein the ground-contacting surface side ridge portion is orthogonal to the block ground-contacting surface; and
in the one sipe wall surface, there is formed an inclined valley portion that is adjacent to and arranged parallel to one of the first inclined ridge portions;
in the one sipe wall surface, there is formed another inclined valley portion that is adjacent to and arranged parallel to another of the first inclined ridge portions, the inclined valley portions provided outside the inclined ridge portions with respect to the outer sipe-lengthwise-direction end sides;
in the one sipe wall surface, there is formed a pair of ground-contacting surface side valley portions that respectively extend from the inclined valley portions toward the block ground-contacting surface side, wherein the ground-contacting surface side valley portions are orthogonal to the block ground-contacting surface;
in the one sipe wall surface, there is formed a second pair of inclined ridge portions respectively adjacent to and arranged parallel to the inclined valley portions, the second pair of inclined ridge portions respectively extending linearly toward different sipe-lengthwise-direction end sides so that the second inclined ridge portions become farther apart as the second inclined ridge portions extend in the radial direction away from the block ground-contacting surface; and a pair of ground-contacting surface side ridge portions that respectively extend from the second inclined ridge portions toward the block ground-contacting surface side, wherein the ground-contacting surface side ridge portions are orthogonal to the block ground-contacting surface;
in the one-sipe wall surface, one of the first pair of inclined ridge portions, one of the inclined valley portions, and one of the second pair of inclined ridge portions form a V shape in a direction perpendicular to the length direction of the sipe.

2. The pneumatic tire according to claim 1, wherein
in the other sipe wall surface, there is formed a pair of inclined valley portions that engage with the pair of inclined ridge portions; and
in the other sipe wall surface, there is formed a ground-contacting surface side valley portion that engages with the ground-contacting surface side ridge portion.

3. The pneumatic tire according to claim 1, wherein angles of inclination of each of the inclined ridge portions with respect to the tire radial direction is in the range of 20° to 70°.

4. The pneumatic tire according to claim 1, further comprising a pair of second linear ridge portions, each of the pair of second ridge portions being merged with a respective one of the pair of inclined ridge portions at a midway point.

5. The pneumatic tire according to claim 4, wherein an angle of inclination with respect to the tire radial direction of the second linear ridge portion is greater than an angle of inclination with respect to the tire radial direction of the inclined ridge portion.

6. The pneumatic tire according to claim 1, wherein the shapes of the one sipe wall surface and the other sipe wall surface are symmetrical in a block width direction.

7. The pneumatic tire according to claim 1, wherein an air gap portion that alleviates stress that occurs because of tearing force is formed in a sipe bottom of the sipe.

8. The pneumatic tire according to claim 1, wherein in the one-sipe wall surface, another of the first pair of inclined ridge portions, another of the inclined valley portions, and another of the second pair of inclined ridge portions form a V shape in a direction perpendicular to the length direction of the sipe.

* * * * *